April 20, 1937. C. C. ELLIOTTE 2,077,621
CHILD'S CONVERTIBLE VEHICLE
Filed Feb. 8, 1935
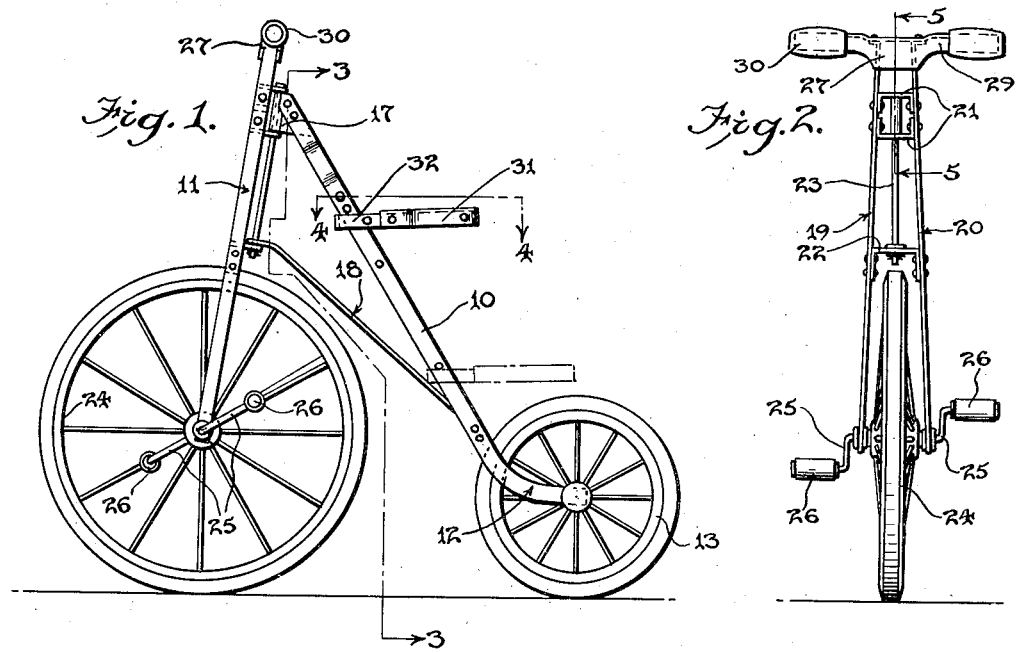
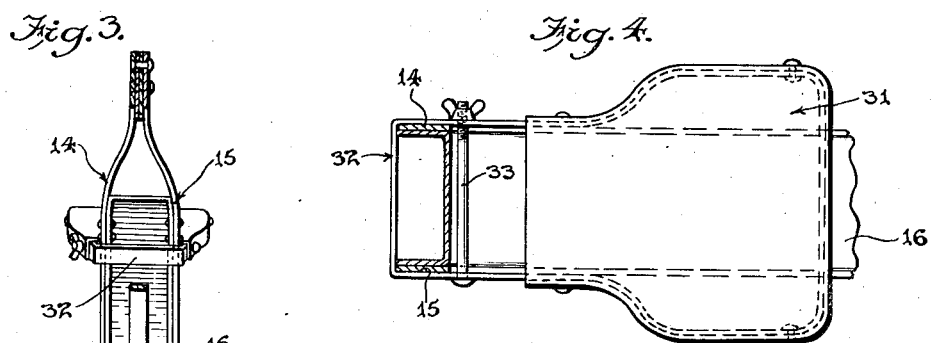
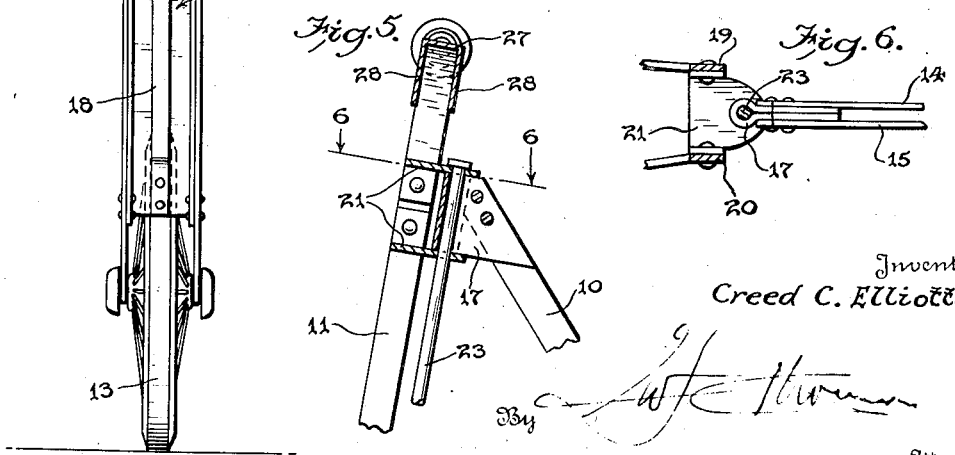
Inventor
Creed C. Elliotte,
By
Attorney Patented Apr. 20, 1937

2,077,621

UNITED STATES PATENT OFFICE 2,077,621

CHILD'S CONVERTIBLE VEHICLE

Creed C. Elliotte, Richmond, Va.

Application February 8, 1935, Serial No. 5,637

11 Claims. (Cl. 208—113)

The present invention relates generally to vehicles for children's use and more particularly to a child's vehicle which may either be pedaled, with the user seated thereon, or employed as a skipmobile or scooter, my primary object being the provision of a vehicle adaptable to ready conversion from one use to the other by reason of quickly adjustable means which will be appealing to the child and may be manipulated without bolts, clamps or other fastenings requiring special tools.

A further object of the invention is the provision of a wheeled vehicle of the above type which will be inexpensive both in first cost and upkeep, which may be easily and effectively steered in use, and which will be strong and durable.

With the above general objects in mind, other and further detailed objects, as well as the resulting advantages of the invention, will clearly appear in the course of the following description, reference being had to the accompanying drawing, which forms a part of the specification, and wherein:—

Fig. 1 is a side elevation of the complete vehicle.

Fig. 2 is a front elevation thereof.

Fig. 3 is a vertical sectional view taken substantially on line 3—3 of Fig. 1 and looking rearwardly.

Fig. 4 is a detail horizontal section taken substantially on line 4—4 of Fig. 1, looking downwardly.

Fig. 5 is a detail vertical section taken substantially on line 5—5 of Fig. 2

Fig. 6 is another detail horizontal section taken substantially on line 6—6 of Fig. 5.

Referring now to these figures, the main frame of the improved vehicle, indicated generally at 10 is, by reason of the arrangement of parts as hereinafter made plain positioned in a substantially abruptly inclined position, its upper forward end being turnably connected to the upper portion of the front wheel support generally indicated at 11, and its lower end having a wheel supporting fork 12 which in the present instance straddles and supports a small rear wheel 13. It will be noted that this wheel supporting fork 12 at the lower rear portion of the main frame is curved, the curvature augmenting the abruptly angular position of the main frame.

The main frame 10 consists of a pair of side rails 14 and 15 connected for the major portion of their length, and spaced apart, as best seen in Fig. 3 by a longitudinally flanged body plate 16, the upper extremities of the side rails 14 and 15 being bent inwardly toward one another and rigidly secured to an angularly disposed and apertured bearing plate 17. Adjacent to the lower end of the body plate 16 of the main frame there is rigidly secured thereto the rear end of a forwardly extending brace bar 18 and the bent forward extremity of this bar has an aperture in line with the aperture of the bearing plate 17 just above mentioned.

The front wheel support 11 likewise consists of side rails 19 and 20 connected at vertically spaced points by transverse webs 21 and 22, each of which webs has portions extending rearwardly beyond the side rails 19 and 20 and an aperture for the reception of an elongated pivot bolt 23 which extends through the bearing plate 17 and the forward aperture of the brace bar 18 so as to thus turnably connect the main frame 10 with the front wheel support 11.

Those portions of the side rails 19 and 20 of the front wheel support below the lower web 22 constitute a front wheel fork straddling a front wheel 24 of substantially greater diameter than the rear wheel 13 and provided with cranks 25 and pedals 26 by means of which the vehicle may be propelled in one use thereof.

For the control of the steering of the vehicle, the front wheel support 11 has an upper head to which the angular upper extremities of its side rails 19 and 20 are riveted or otherwise securely fastened. This head, generally indicated at 27 sits on the upper ends of the side rails and is provided with front and rear flanges 28 at the front and rear portions of said side rails, the head being provided with lateral extensions bent to form tubular handle bars 29 for the reception of grips 30.

On the main frame 10 is a relatively broad flat support 31, preferably consisting of a section of sheet metal, the flanged edges of which are secured at their sides to the rear portions of the sides of a U-shaped frame 32. That portion of this frame 32 projecting forwardly of its body plate surrounds the main frame 10, parallel to which the side portions of the frame 32 are connected by a transverse gripping bolt 33, forming with the forward end of the frame 32 an opening sufficient to slidably receive the main frame for ready movement of the support 31 upwardly and downwardly upon the frame as long as the support 31 is at right angles or approximately right angles to the said frame. When however this support 31 is moved to a horizontal position as shown in Fig. 1, that is acutely angular with respect to the main frame, the latter is gripped frictionally between the forward end of the support frame 32 and the transverse bolt 33 so that this support may thus maintain itself in horizontal position at any desired elevation on the main frame.

The support 31 may thus be readily positioned at the upper portion of the main frame 10 as shown in full lines in Fig. 1, in which position it constitutes a seat for the user where the vehicle is propelled by means of the pedals 26 and thus employed as a bicycle or velocipede. On the other hand quick conversion of the vehicle may be accomplished by letting the support 31 downwardly upon the main frame 10 to the position shown in dotted lines in Fig. 1 where it is but slightly spaced above the small rear wheel 13 and in this position constitutes a foot rest in the use of the vehicle as either a skipmobile or scooter.

Obviously the conversion from one use to another will not only be appealing to children users of the vehicle but may be readily and easily accomplished without the use of special tools or equipment or the manipulation of bolt or other fastenings, and is provided for without detracting from the normal, natural strength and durability of the vehicle as a whole and without adding to its low cost of production.

What is claimed is:—

1. A child's convertible vehicle including a front wheel and a rear wheel, foot propelling means in connection with the front wheel, a front wheel supporting upright having a handle bar at its upper end and having vertically spaced rearwardly projecting portions, a main frame having at its upper forward end an angularly disposed bearing plate, said main frame being abruptly inclined downwardly and rearwardly and having at its lower rear end a fork supporting the rear wheel, a brace member secured at its rear end to the lower rear portion of the main frame and having its forward end projecting into alinement with the bearing member of the main frame and spaced below the latter, a pivot bolt extending through the rearwardly projecting portions of the front wheel upright and through the bearing plate of the main frame and the forward end of the said brace, and a support adjustable in connection with the main frame for forming a seat when positioned at the upper portion of said frame and for forming a foot rest when positioned at the lower portion of the frame.

2. A child's convertible vehicle comprising a foot propelled front wheel and a substantially smaller rear wheel, a main frame including a substantially horizontal rear wheel supporting portion abruptly adjacent the front of the rear wheel inclined forwardly and upwardly between said wheels, a support freely adjustable for the major portion of the length of said main frame when at right angles thereto and having means to frictionally hold the same in connection with the main frame at various elevations when in an acutely angular position with respect to the frame and substantially parallel with the ground, a front wheel upright turnably connected to the upper forward end of the main frame, and a handle bar at the upper end of said upright.

3. A child's convertible vehicle including front and rear wheels, a turnable front wheel support, a main frame abruptly inclined rearwardly and downwardly from said front wheel support and having a support for the rear wheel, and a relatively broad member slidable on said main frame and having automatically acting means to grip the same at any selected point between the wheels when said member is acutely angular with respect to the main frame and substantially parallel with the ground, said member in an upper forward position constituting a seat located between the wheels and in a lower position constituting a foot rest located over the rear wheel close thereto.

4. A child's convertible vehicle comprising a foot propelled front wheel, a turnable front wheel support, a substantially smaller rear wheel, a main frame having a forked connection with the axis of the rear wheel and embracing a portion of the latter, said frame being abruptly inclined forwardly and upwardly from adjacent the rear wheel and at its upper end pivotally connected to the front wheel support above the front wheel, and a relatively broad member slidable on said main frame and having automatically acting means to grip the same at any selected point when said member is acutely angular with respect to the main frame and substantially parallel with the ground, said member in an upper position constituting a seat located between the wheels and in a lower rear position constituting a foot rest located over the rear wheel and close thereto.

5. A child's convertible vehicle including a front wheel and a rear wheel, foot propelling means in connection with the front wheel, a front wheel supporting upright having a handle bar at its front end having rearwardly directly projecting portions, a main frame having at its upper forward end a bearing plate, said main frame being inclined downwardly and rearwardly and having at its lower rear end a supporting connection with the rear wheel, a brace member secured at its rear end to the lower portion of the main frame and having its forward end projecting into alinement with the bearing member of the main frame and spaced below the latter, a pivot bolt extending through the rearwardly projecting portions of the front wheel upright and through the bearing plate of the main frame and the forward end of said brace, and a support adjustable in connection with the main frame for forming a seat when positioned at the upper portion of said frame and for forming a foot rest when positioned at the lower portion of the frame.

6. A child's convertible vehicle comprising a foot propelled front wheel and a rear wheel, a main frame inclined forwardly and upwardly between said wheels and having a support at its lower end for the rear wheel, means for supporting the front wheel, the main frame having connection with the front wheel supporting means, a relatively broad support having a substantially U-shaped forward extension secured thereto, and an element connecting the sides of the U-shaped extension in spaced relation to the front end of the latter and with the front end of the latter forming an opening to slidably receive the main frame whereby to adjust said relatively broad support for the major portion of the length of said main frame when at right angles thereto and to frictionally hold the same in connection with the main frame at various elevations between the wheels when in an acutely angular position with respect to the frame and substantially parallel with the ground.

7. A child's convertible vehicle including a front wheel and a rear wheel, foot propelling means in connection with the front wheel, a front wheel supporting upright having a handle bar at its upper end, a main frame having a bearing plate at its upper forward end, means for connecting said main frame to the axis of the rear wheel, a brace member secured at its rear end to the main frame and having its forward end projecting into alinement with the bearing member of the main frame and spaced below the latter, a pivot bolt extending through said bearing plate of the main frame and the forward end of said brace, and a support adjustably mounted on the main frame between said wheels.

8. A combined bicycle and scooter contrivance comprising a turnable front wheel having pedals operatively connected therewith and a rear wheel, means operatively connecting the front and rear wheels including an upwardly inclined frame member between said wheels, and a combined seat and foot rest member adjustable on said frame member and when adjusted to one position between the front and rear wheels constituting a seat to permit pedalling of the contrivance and when lowered to a position over the rear wheel constituting a foot rest accessible to the operator's foot to permit pushing of the contrivance as a scooter.

9. A combined bicycle and scooter contrivance comprising a turnable front wheel having pedals operatively connected therewith and a rear wheel, means operatively connecting the front and rear wheels including an upwardly inclined frame member between said wheels, a combined seat and foot rest member adjustable on said frame member and when adjusted to one position between the front and rear wheels constituting a seat to permit pedalling of the contrivance and when lowered to a position over the rear wheel constituting a foot rest accessible to the operator's foot to permit pushing of the contrivance as a scooter, and means for automatically clamping said combined seat and foot rest in said different positions.

10. A combined bicycle and scooter contrivance comprising a turnable front wheel having pedals operatively connected therewith and a rear wheel, means operatively connecting the front and rear wheels including an upwardly inclined frame member between said wheels, and a combined seat and foot rest including a forward open extension and means coacting with said open extension to provide an opening to slidably and adjustably embrace said frame member to position the combined seat and foot rest between the wheels to permit pedalling of the contrivance and when positioned in a lower position on said frame member constituting a foot rest to permit foot pushing of the contrivance.

11. A combined bicycle and scooter contrivance comprising a turnable front wheel having pedals operatively connected therewith and a rear wheel, means operatively connecting the front and rear wheels including an upwardly inclined frame member between said wheels, and a combined seat and foot rest including a forward open extension and means coacting with said open extension to provide an opening to slidably and adjustably embrace said frame member to position the combined seat and foot rest between the wheels to permit pedalling of the contrivance and when positioned in a lower position on said frame member constituting a foot rest to permit foot pushing of the contrivance, the inclination of said frame member and the opening in the forward extension of the combined seat and foot rest member coacting to permit adjustment of the latter along the frame member when the seat and foot rest member is disposed at a right angle to the frame member and having means to frictionally grip the frame member when at an acutely angular position with respect to said frame member and substantially parallel with the ground.

CREED C. ELLIOTTE.

CERTIFICATE OF CORRECTION.

Patent No. 2,077,621.                                              April 20, 1937.

CREED C. ELLIOTTE.

It is hereby certified that error appears in the printed specification of the above numbered patent requiring correction as follows: Page 1, first column, line 43, after "lower" insert rear; page 2, first column, lines 55-56, claim 2, strike out the words "adjacent the front of the rear wheel" and insert the same after "inclined" in line 56, of said claim; and that the said Letters Patent should be read with these corrections therein that the same may conform to the record of the case in the Patent Office.

Signed and sealed this 8th day of June, A. D. 1937.

Henry Van Arsdale (Seal)                                              Acting Commissioner of Patents.